Feb. 13, 1923.

O. L. FOWLER 1,445,134

DEVICE FOR HEATING AND PURIFYING WATER

Filed Mar. 10, 1922    2 sheets-sheet 1

INVENTOR
Otis L. Fowler

Patented Feb. 13, 1923.

1,445,134

UNITED STATES PATENT OFFICE.

OTIS L. FOWLER, OF LYNBROOK, NEW YORK.

DEVICE FOR HEATING AND PURIFYING WATER.

Application filed March 10, 1922. Serial No. 542,689.

*To all whom it may concern:*

Be it known that I, OTIS L. FOWLER, a citizen of the United States, residing at Lynbrook, in the county of Nassau and State of New York, have invented a new and Improved Device for Heating and Purifying Water, of which the following is a specification.

My invention relates generally to water heating devices and the object of my improvements is to provide a simple and economically operative means for utilizing the vapor from hot waste water from industrial plants, or exhaust steam, in heating a water supply and at the same time to recover a portion of the foul waste water free from impurities so that it can be again utilized.

The invention can also be applied with advantage in distilling operations to the end of recovering a volatile content free from impurities at a relatively low temperature.

In carrying my invention into effect the hot waste water or hot liquid to be treated is admitted into the lowermost of a series of chambers composing a condensing column and is caused to pass upward from chamber to chamber by means of diminishing pressure in the several chambers from the lower to the higher.

In the chambers the vapors from the hot liquid are condensed by the action of a stream of cooling water passing downward through a series of condensers located in the several chambers.

The hot products of condensation are added to the stream of condensing cooling water thereby heating it, or are drawn off in the hot state, as the case may be, and are thus recovered free from the impurities contained in the liquid treated. The unvaporized residue of the liquid treated containing the impurities originally present in it is siphoned off from the uppermost chamber of the column and goes to waste.

Figure 1:
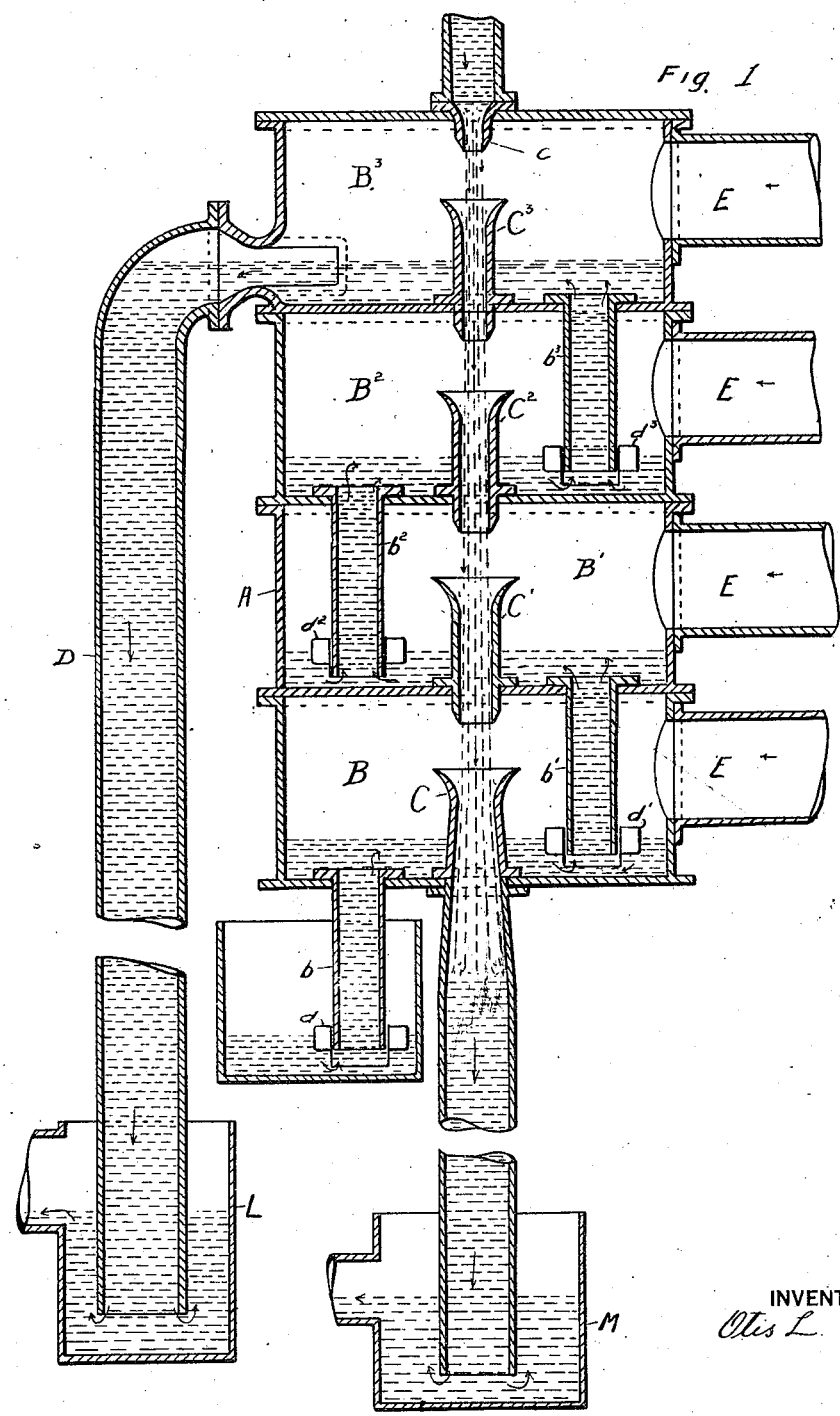
Figure 2:
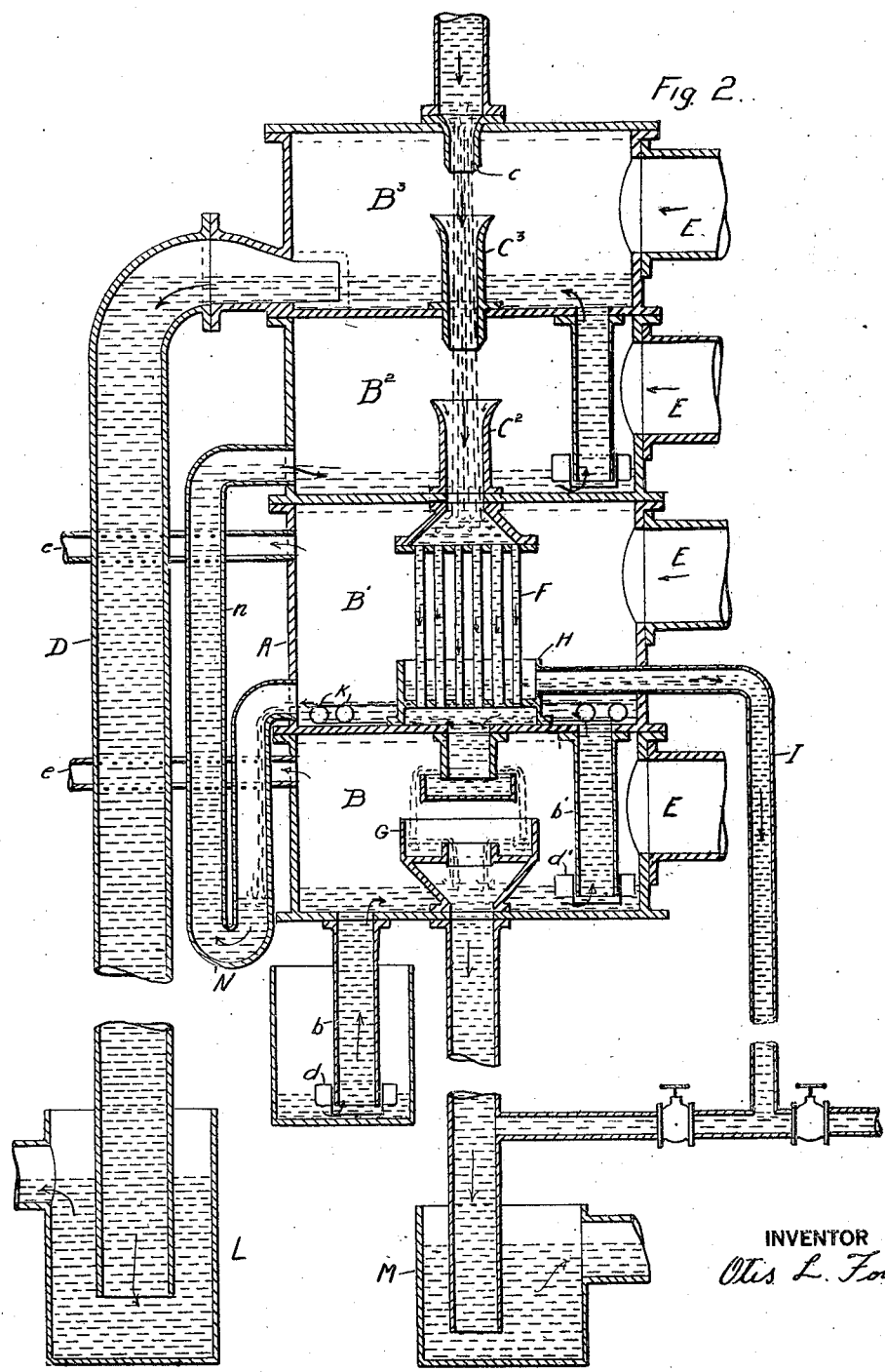

The invention will be best understood by reference to the accompanying drawings, illustrating embodiments thereof, Fig. 1 of which shows a diagrammatic representation of a vertical cross section of the apparatus and Fig. 2 shows a similar view of a modified form of construction.

Referring to the drawings, A, indicates a column composed of a series of compartments, or chambers, B, $B^1$, $B^2$, $B^3$, located one above another.

In the chambers, B, as shown in Fig. 1, are located a series of siphon, or jet condensers, C, $C^1$, $C^2$, $C^3$, in alignment one with another, to the uppermost of which cooling water is admitted through inlet, $c$, in the top of the column. The waste water, or other liquid to be treated, enters the lowermost chamber, B, by pipe, $b$, and thence is free to flow successively into the chambers above by pipes $b^1$, $b^2$, $b^3$, to the uppermost chamber, $B^3$, whence the residue thereof is siphoned off by pipe, D.

In the operation of the device cooling water entering through inlet, $c$, passes down through the several condensers, C, effecting condensation of vapor in the several chambers. The condensation is greatest in the uppermost chamber and progressively less in the chambers below so that the absolute pressure is greatest in the lowest chamber, B, and progressively less in the chambers above to the top. The hot water enters through pipe, $b$, into chamber, B, where the steam given off is condensed by the water flowing from condenser, $C^1$, to condenser, C, the products of condensation being added to the stream of water flowing through the condensers. Since the pressure is less in chamber, $B^1$, than in chamber, B, the water rises through pipe, $b'$, from chamber, B to chamber, $B^1$, wherein it is cooled to the boiling point at the pressure therein, with further condensation of vapor and addition of the products of condensation to the stream flowing through the condensers.

In the same manner the water is caused to flow from one chamber to another, to the uppermost chamber, $B^3$, whence the unevaporated water, containing the impurities originally present in it, is siphoned off through pipe, D.

The water entering through inlet, $c$, is heated as it passes downward through the condensers and its volume is increased by the addition of the products of condensation. In this manner a supply of clean hot water is provided, with recovery of the foul hot water originally entering the apparatus, in a pure state.

In order to maintain a proper water level in the several chambers the pipes, $b'$, etc., may be provided with float valves, $d$, $d^1$, $d^2$, $d^3$, which are opened by the rise of water in the several chambers, or other suitable regulating device, such as a draw off pipe, N, which may be continued upward by pipe, $n$, to provide connection with the chamber above. E, E, E, E, indicate the inlets of steam pipes to the chambers, B, whereby exhaust steam from engines, pump, etc. may be admitted to the chambers, to be condensed therein in the same manner as the steam from the water. Any oil or other foreign matter carried by such steam will be removed by contact of the steam with the water in the chambers and thus the condensate added to the water supply will be clean.

In the modified form of the device illustrated in Fig. 2, I have shown the substitution of other forms of condensers in place of the siphon condensers shown in Fig. 1, such as a surface condenser, F, or a barometric condenser, G. In case such forms of condensers or either of them are employed, it is necessary that the chambers in which they are located shall be connected with an air pump, as by pipes, $e$, $e$, so as to provide for drawing off any air that may leak into the system. In case a surface condenser is employed the condensate is collected in a receptacle, H, through the bottom of which the condenser tubes pass, and is siphoned off therefrom through a pipe, I.

When it is desired to use the device for purposes of distillation surface condensers are preferably employed in all the chambers and means of applying additional heat to the chambers, such as steam coils, K, may be provided.

By means of my invention I enable the utilization of the heat of hot waste waters in heating a fresh supply of water in an efficient and economical manner and at the same time provide for the recovery of such hot waste water free from impurities. The apparatus also provides an economical form of still enabling distillation to be effected at a lower temperature than has been heretofore employed and discharging the residue of distillation at a temperature lower than the initial temperature of the liquid treated.

Having thus described my invention what I claim as new and desire to secure by Letters Patent is:—

1. In a heating and condensing device the combination of a series of superimposed chambers, means for admitting heated liquid to said chambers, a series of condensers located in said chambers and means for causing a downward flow of cold water through the condensers whereby vapor is condensed in the chambers and the liquid is thereby caused to flow upward through the chambers.

2. In a condensing device, the combination of a series of chambers, means for admitting steam to each of said chambers a series of condensers located in said chambers, means for causing a flow of cooling water through the condensers whereby the steam is condensed in the chambers, and means for drawing off the condensate.

3. The process of purifying and recovering heat from hot waste water which consists in causing the water to flow from below upward through a series of superimposed chambers, maintaining a progressively reduced pressure from below upward in said chambers, passing cooling water through condensers located in said chambers so as to condense the water vapor in the chambers and cool the water in each chamber to the boiling point under the pressure therein and adding the condensate to the water passing through the condensers.

4. The process of purifying hot liquids, which consists in causing the liquid to flow from below upward through a series of superimposed chambers, maintaining a progressively reduced pressure from below upward in said chambers, passing cooling water through condensers located in said chambers so as to condense the water vapor in the chambers and cool the water in each chamber to the boiling point under the pressure therein and adding the condensate to the water passing through the condensers.

In testimony whereof I affix my signature, this 6th day of March 1922.

OTIS L. FOWLER.